(12) United States Patent
Sundaram et al.

(10) Patent No.: US 9,571,479 B1
(45) Date of Patent: *Feb. 14, 2017

(54) ROLE-BASED ACCESS CONTROL USING DYNAMICALLY SHARED CLOUD ACCOUNTS

(71) Applicant: SYMANTEC CORPORATION, Mountain View, CA (US)

(72) Inventors: Sharada Sundaram, Mountain View, CA (US); Sanjay Sawhney, Cupertino, CA (US); Robert Koeten, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 14/231,617

(22) Filed: Mar. 31, 2014

Related U.S. Application Data

(63) Continuation of application No. 13/463,612, filed on May 3, 2012, now Pat. No. 8,762,512.

(60) Provisional application No. 61/482,189, filed on May 3, 2011.

(51) Int. Cl.
*H04L 29/06* (2006.01)

(52) U.S. Cl.
CPC ............ *H04L 63/08* (2013.01); *H04L 63/083* (2013.01); *H04L 63/0815* (2013.01); *H04L 63/107* (2013.01)

(58) Field of Classification Search
None
See application file for complete search history.

(56) References Cited

U.S. PATENT DOCUMENTS

| | | | |
|---|---|---|---|
| 7,264,152 B2 | 9/2007 | Tsuei et al. | |
| 8,020,195 B2 | 9/2011 | Frost et al. | |
| 8,762,512 B1 | 6/2014 | Sundaram et al. | |
| 9,104,858 B1 | 8/2015 | Sundaram et al. | |
| 2001/0005890 A1 | 6/2001 | Nitaki | |
| 2002/0141589 A1 | 10/2002 | Garay et al. | |
| 2004/0230831 A1* | 11/2004 | Spelman | G06F 21/33 726/8 |
| 2004/0254894 A1 | 12/2004 | Tsuei et al. | |

(Continued)

OTHER PUBLICATIONS

Song, Zhexuan, "Trusted Anonymous Execution: A Model to Raise Trust in Cloud" 2010 Ninth International Conference on Grid and Cloud Computing, Nov. 1-5, 2010; pp. 133-138, IEEE Computer Society.

(Continued)

*Primary Examiner* — Lashonda Jacobs
(74) *Attorney, Agent, or Firm* — Wilmer Cutler Pickering Hale and Dorr LLP

(57) ABSTRACT

A server computer system within a network of an organization receives a request from a user to access a cloud account. The request includes a user identifier. The server computer system authenticates the user for access to the cloud account based on the user identifier, identifies one or more predetermined roles associated with the cloud account for the user, and identifies one or more pseudo accounts associated with the cloud account. The server computer system further maps the user to the one or more pseudo accounts, and provides user access to the cloud account based on the mapping and with access privileges corresponding to the one or more pseudo accounts.

20 Claims, 11 Drawing Sheets

(56) References Cited

U.S. PATENT DOCUMENTS

| | | |
|---|---|---|
| 2005/0055426 A1 | 3/2005 | Smith et al. |
| 2006/0026438 A1 | 2/2006 | Stern et al. |
| 2006/0248598 A1* | 11/2006 | Johnson ................ G06F 21/33 726/27 |
| 2007/0294750 A1 | 12/2007 | Burch et al. |
| 2009/0287750 A1 | 11/2009 | Banavar et al. |
| 2011/0087854 A1 | 4/2011 | Rushworth et al. |
| 2011/0231280 A1* | 9/2011 | Farah .................... G06Q 10/10 705/26.8 |
| 2011/0231899 A1* | 9/2011 | Pulier ................ G06F 9/45558 726/1 |
| 2011/0246765 A1 | 10/2011 | Schibuk |
| 2011/0265147 A1* | 10/2011 | Liu ........................ H04L 63/08 726/4 |
| 2011/0307947 A1* | 12/2011 | Kariv .................... H04L 63/08 726/9 |
| 2012/0144501 A1* | 6/2012 | Vangpat ............... H04L 63/108 726/28 |
| 2012/0233265 A1 | 9/2012 | Joey et al. |
| 2012/0278861 A1* | 11/2012 | Lu ...................... H04L 63/0853 726/4 |
| 2013/0024919 A1* | 1/2013 | Wetter ................. G06F 21/335 726/6 |
| 2013/0060839 A1* | 3/2013 | Van Biljon ............ G06Q 30/04 709/203 |
| 2013/0067549 A1* | 3/2013 | Caldwell ............. H04L 67/2809 726/7 |

OTHER PUBLICATIONS

USPTO Non-Final Office Action mailed Aug. 13, 2013 for U.S. Appl. No. 13/463,612.

USPTO Notice of Allowance mailed Feb. 18, 2014 for U.S. Appl. No. 13/463,612.

USPTO Non-Final Office Action mailed Jan. 2, 2014 for U.S. Appl. No. 13/463,618.

USPTO Final Office Action mailed Jun. 20, 2014 for U.S. Appl. No. 13/463,618.

* cited by examiner

ROLE-BASED ACCESS CONTROL USING DYNAMICALLY SHARED CLOUD ACCOUNTS

RELATED APPLICATIONS

This application is a continuation of U.S. patent application Ser. No. 13/463,612 filed May 3, 2012 which is related to and claims the benefit of U.S. Provisional Patent Application No. 61/482,189 filed May 3, 2011, both of which are hereby incorporated by reference herein.

TECHNICAL FIELD

Embodiments of the present disclosure relate to cloud accounts and, more particularly, to a technique of role-based access control using dynamically shared cloud accounts.

BACKGROUND

A business, corporation, and/or company, is commonly referred to as an Enterprise. Cloud computing is generally becoming the platform of choice for Enterprises that want to reduce operating expenses and be able to scale resources rapidly. "Clouds" may be provided by different cloud providers to provide Enterprises access of computing resources over a computer network. Clouds can provide Software-as-a-service (SaaS), sometimes referred to as "on-demand software," to various Enterprises. SaaS is a software delivery model in which software and its associated data are hosted centrally, typically in a cloud, and are accessed by user using, for example, a web browser, over the Internet. SaaS has become a common delivery model for most business applications, such as customer relationship management (CRM).

Many SaaS providers price their services based on the number of Enterprise users accessing their various business applications (e.g., CRM applications). With such a pricing model, Enterprise may incur unwarranted costs if not all of the accounts that are being paid for are being used fully. For example, in an Enterprise, not all employees may use the travel application provided by a SaaS provide at the same time. Nonetheless, many Enterprises pay for an account for each employee and the SaaS provider bills the Enterprise for all the active accounts regardless of use.

SaaS is a cloud service and has its own specification of roles and permissions. Application programming interfaces (APIs) associated with SaaS may not be generic and vary from provider to provider. As a result, a setup on one particular SaaS may therefore be different than a setup on another SaaS. Therefore, role-based access control may be difficult to implement, especially across multiple SaaS or cloud service platforms. In view of the foregoing, it may be understood that there may be significant problems and shortcomings associated with conventional role-based access control technologies as applied to SaaS infrastructure.

SUMMARY

In one embodiment, a system for providing role-based access control using dynamic shared accounts is described. An exemplary system may include a memory and a processor that is coupled to memory. In one embodiment, the system, within a network of an organization, receives a request from a user to access a cloud account. The request includes a user identifier of the user. The system authenticates the user for access to the cloud account based on the identifier. The system identifies one or more predetermined roles associated with the cloud account for the user. The system further identifies one or more pseudo accounts associated with the cloud account. The pseudo accounts define one or more slots associated with the one or more predetermined roles for the cloud account. Access privileges to the cloud account correspond to the one or more pseudo accounts. The system further maps the user to the one or more pseudo accounts. The mapping includes matching the one or more predetermined roles for the user with the one or more pseudo accounts. The system to provide the user access to the cloud account based on the mapping and with the access privileges corresponding to the one or more pseudo accounts.

In one embodiment, the cloud account is a shared Software-as-a-Service (SaaS) account. In one embodiment, the user identifier includes a user password. In one embodiment, authenticating the user includes providing a single sign-on access to at least the cloud account, wherein the single sign-on access uses the user identifier.

In one embodiment, mapping the user to the one or more pseudo accounts comprises a dynamic mapping, wherein the dynamic mapping comprises performing an action in the event the one or more pseudo accounts are unavailable. In another embodiment, the action includes at least one of notifying the user of the unavailability of the one or more pseudo accounts; halting the mapping action; or determining availability of one or more other pseudo accounts of equal or lesser access privileges and mapping the user to the one or more other pseudo accounts.

In one embodiment, the system receives an additional request for access to an other cloud account. The request includes the user identifier. The system authenticates the user for access to the other cloud account based on a single sign-on access to the other cloud account. The system further identifies one or more predetermined roles associated with the other cloud account for the user. The system identifies one or more pseudo accounts associated with the other cloud account. The access privileges to the other cloud account correspond to the one or more pseudo accounts. The system maps the user to the one or more pseudo accounts. The mapping includes matching the one or more predetermined roles associated with the other cloud account for the user with one or more pseudo accounts associated with the other cloud account. The system further to provide the user access to the cloud account based on the mapping and with the access privileges to the other cloud account corresponding to the one or more pseudo accounts associated with the other cloud account.

In additional embodiments, methods for performing the operations of the above described embodiments are also implemented. Additionally, in embodiments of the present disclosure, a non-transitory computer readable storage medium stores methods for performing the operations of the above described embodiments.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the invention are directed to a method and system for providing dynamically shared cloud accounts. A computing system identifies shared cloud accounts of a cloud that are created for an entity (e.g., an organization). The computing system resides outside of the cloud. The number of shared cloud accounts is less than a number of users of the entity (e.g., Enterprise) that use the cloud. The computing system determines that one of the users is authorized to use any of the shared cloud accounts in response to a determination that identity information of the user is valid. The computing system receives a request from the user to access the cloud and determines whether one of the shared cloud accounts is available to be assigned to the user. The computing system adds the request to a queue based on a determination that none of the shared cloud accounts is available and assigns one of the cloud accounts to the user based on a determination that one of the shared cloud accounts is available.

Embodiments of the invention provide costs savings for an organization by providing an infrastructure to allow the organization to setup fewer cloud accounts at the cloud.

Figure 1:
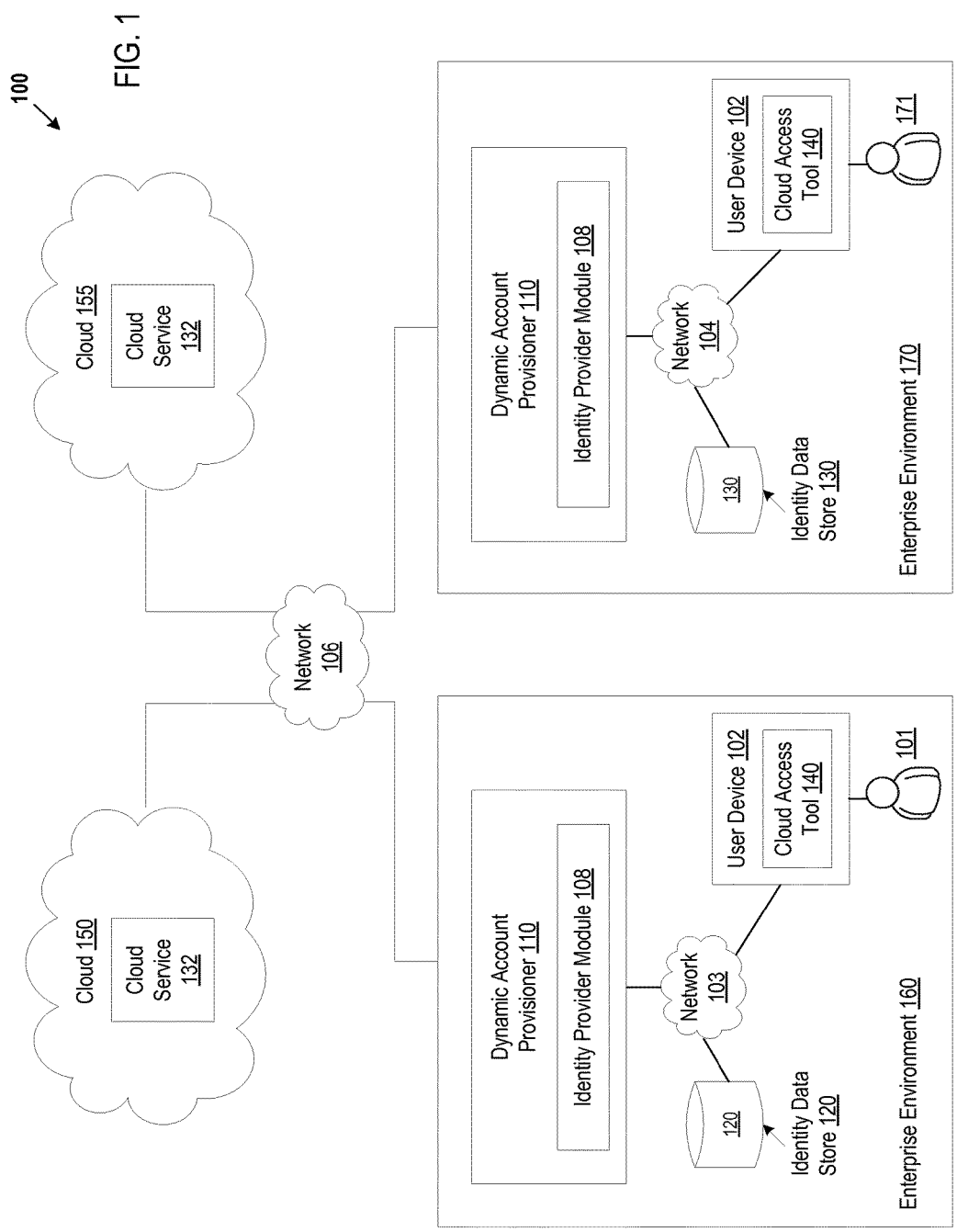
FIG. 1 illustrates exemplary system architecture, in accordance with various embodiments of the present disclosure.

FIG. 1 is a block diagram of an exemplary network architecture 100 in which embodiments of the present invention can be implemented. The network architecture 100 can include one or more enterprise (e.g., business, corporation, company) environments 160,170 including one or more user devices 102 communicating with one or more clouds 150, 155 via a network 106. The network 106 can be a local area network (LAN), a wireless network, a mobile communications network, a wide area network (WAN), such as the Internet, or similar communication system, and can include any number of networking and computing devices such as wired and wireless devices.

The user devices 102 can be portable computing devices such as, and not limited to, laptop or tablet computers, cellular telephones (e.g., smartphones), personal digital assistants (PDAs), portable media players, netbooks, and the like. The user devices 102 can be non-portable computing devices such as, and not limited to, desktop computers, set-top boxes associated with a television, gaming consoles, and so on. The user devices 102 can be variously configured with different features to enable access to the various cloud services 132 made available by the clouds 150,155. A user device 102 can host a cloud access tool 140 to access the clouds 150,155. Examples of a cloud access tool 140 include, and are not limited to, a desktop web browser, a mobile device web browser, a mobile device application, a cloud connector plugin (e.g., cloud email connector plugin), a link (e.g., URL in an email), etc.

A cloud 150,155 can provide one or more cloud services 132 to Enterprise environments 160,170 using cloud computing. An enterprise as referred to herein can represent any organization including, for example, a business organization such as a corporation, an educational institution such as a college and university, etc. The cloud 150,155 can use a Software-as-a-Service (SaaS) model in which cloud computing companies provide software functionality, for example, to Enterprise users 101,171 on a subscription basis. A cloud 150,155 can include one or more server computing systems to implement the SaaS model. The server computing systems are controlled by a cloud service provider and not an enterprise. Examples of cloud services 132 are business applications running on the cloud and including, for example, accounting, collaboration, customer relationship management (CRM), enterprise resource planning (ERP), invoicing, human resource management (HRM), content management (CM), and service desk management.

Each enterprise environment 160,170 can include a dynamic account provisioner 110 to manage the dynamic sharing of shared cloud accounts amongst users 101,171 in a corresponding Enterprise environment 160,170. In one embodiment, the dynamic account provisioner 110 includes an identity provider module 108 to authenticate the identity of users 101,171 for access to the cloud services 132. In one embodiment, the dynamic account provisioner 110 and identity provider module 108 reside on the same machine (e.g., server computers, desktop computers, etc.). In another embodiment, the dynamic account provisioner 110 and identity provider module 108 reside on the separate machines (e.g., server computers, desktop computers, etc.). The identity provider module 108 may be maintained by an Enterprise (e.g., business, company). In another embodiment, the identity provider module 108 may be maintained by a third party. The identity provider module 108 can be a Single Sign-On (SSO) system. The SSO system can allow a user 101,171 to login to a corresponding local Enterprise network 103,104 using a single set of credentials and have access, according to access policies, to the cloud services 132 provided by the clouds 150,155 without having to individually login to each cloud service 132. The identity provider module 108 can be configured to communicate with a provisioning interface (e.g., SSO interface, Security Assertion Markup Language (SAML) interface) at the clouds 150,155.

The dynamic account provisioner 110 can determine the number of shared cloud accounts to be created for an entity (e.g., Enterprise) at the cloud 150,155. A shared cloud account is a cloud account that can be assigned to different users at different times. For example, there are two shared cloud accounts, Account-X and Account-Y, and there are six users, User-A, User-B, User-C, User-D, User-E, and User-F.

When either Account-X or Account-Y is available, the account can be assigned to any of the users. The number of shared cloud accounts is less than the number of Enterprise users 101,171 for a corresponding Enterprise environment 160,170 that use the cloud service 132. The dynamic account provisioner 110 can use an allocation algorithm to assign a shared cloud account to a user 101,171 based on the availability of the shared cloud accounts.

Figure 2:
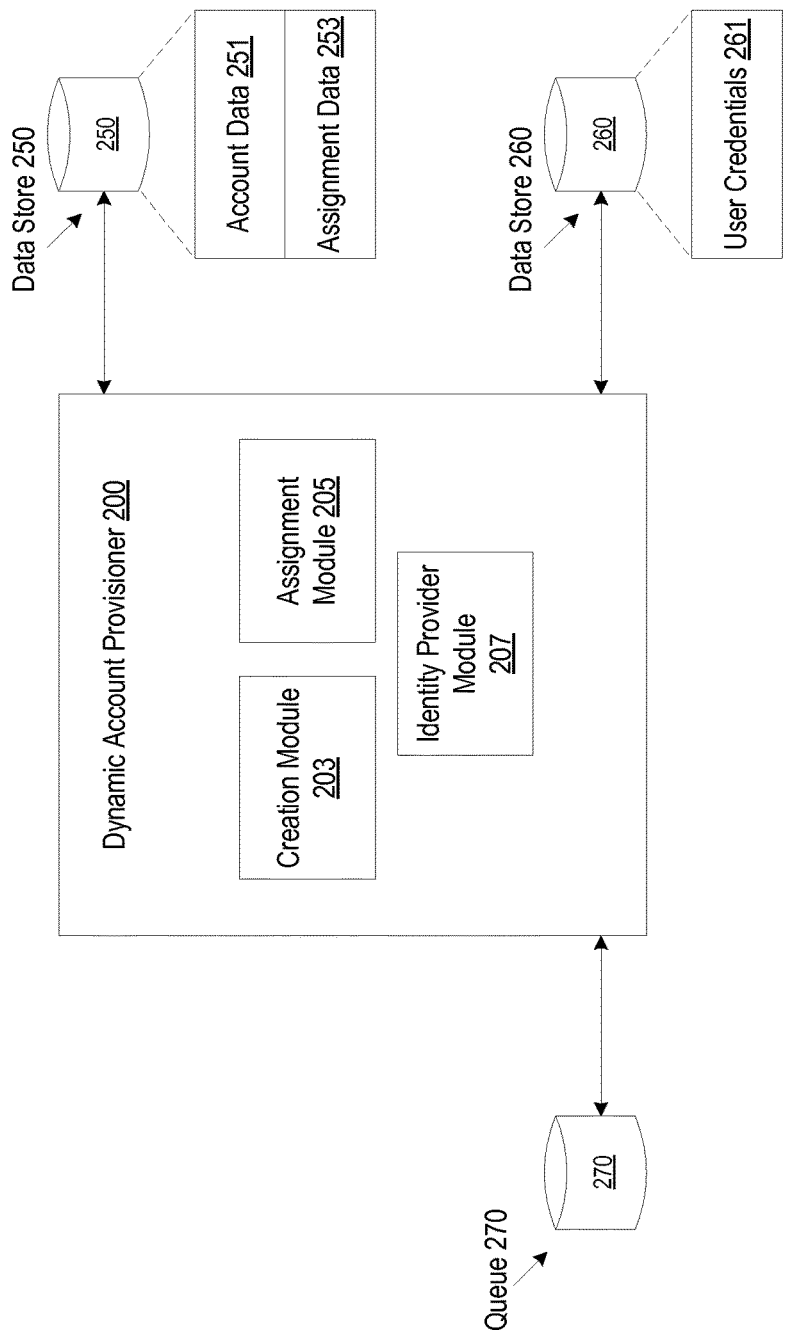
FIG. 2 is a block diagram of a dynamic account provisioner, in accordance with some embodiments.

FIG. 2 is a block diagram of a dynamic account provisioner 200, in accordance with some embodiments. The dynamic account provisioner 200 may be the same as the dynamic account provisioner 110 in FIG. 1. In one embodiment, the dynamic account provisioner 200 includes a creation module 203, an assignment module 205, and an identity provider module 207. Note that in alternative embodiments, the functionality of the creation module 203, the assignment module 205, and the identity provider module 207 may be combined or divided. In one embodiment, the dynamic account provisioner 200 includes a creation module 203 and an assignment module 205 and is coupled to an identity provider module 207.

The creation module 203 can determine the number of shared cloud accounts that should be created at a cloud for an entity (e.g., Enterprise). The number of shared cloud accounts that should be created at the cloud is less than the number of entity users that use the cloud. The creation module 203 can determine a user load representing the number of entity users that use the cloud. The user load can be represented as a percentage. The creation module 203 can use heuristics to determine the number of shared cloud account that should be created. An example of a heuristics can include, and is not limited to, a ratio of n shared cloud accounts that should be created to the m number of entity users that use the cloud that is sufficient to handle the user load. For example, n/m=c, where c is the user load.

The creation module 203 can create and store account data 251 in a data store 250 that is coupled to the dynamic account provisioner 200. The account data 251 can indicate the shared cloud accounts that are created for a cloud. The account data 251 can include data for any number of clouds and shared cloud accounts. The account data 251 can include an account identifier for each shared cloud account. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The identity provider module 207 can determine whether a user is validated to access a cloud based on whether the user can successfully login to an entity (e.g., Enterprise) network. The identity provider module 207 can determine that if a user can successfully login to the entity network, the user is authorized to use any of the shared cloud accounts to access a cloud. A user can log into the identity provider module 207 via user credentials. The identity provider module 207 can authenticate users via first factor credentials (e.g. usernames, passwords) and/or second factor credentials, such as one-time password (OTP), a digital certificate (e.g., public key infrastructure (PKI) certificate), a fingerprint, etc. The identity provider module 207 can manage the user credentials 261 in an identity data store 260 that is coupled to the identity authentication system 108 for user authentication. The identity data store 260 can be a directory (e.g., Active Directory, Lightweight Data Access Protocol (LDAP) directory) that stores the user credentials 261 for a corresponding enterprise environment.

The identity provider module 207 can receive a request from a cloud to validate the identity of a user that is assigned to a shared cloud account. The identity provider module 207 can validate the user identity and provide identity information indicating whether the user identity is valid and/or the user identity itself to the cloud. The identity provider module 207 can use a federated identity protocol, such as, and not limited to, Security Assertion Markup Language (SAML) and OpenID, to provide the identity information to the cloud. One embodiment of providing identity information of a user to a cloud via a federated identity protocol is described in greater detail below in conjunction with FIG. 5.

The assignment module 205 can receive a request for access to a cloud and can assign an available shared cloud account to a user that has been authenticated by the identity provider module 207. The assignment module 205 can provide a shared cloud account identifier to a cloud. In one embodiment, the assignment module 205 selects an available shared cloud account to assign to the user based on an allocation algorithm. An example of an allocation algorithm can include, and is not limited to, a round-robin algorithm. The assignment module 205 can place a request in a queue 270 if there is not a shared cloud account that is available. In one embodiment, the assignment module 205 creates and stores assignment data 253 in the data store 250. The assignment data 253 can indicate which user is assigned to which shared cloud account. The assignment data 253 can a user identifier mapped to a shared cloud account identifier and a corresponding access start time indicator and access end time indicator.

Figure 3:
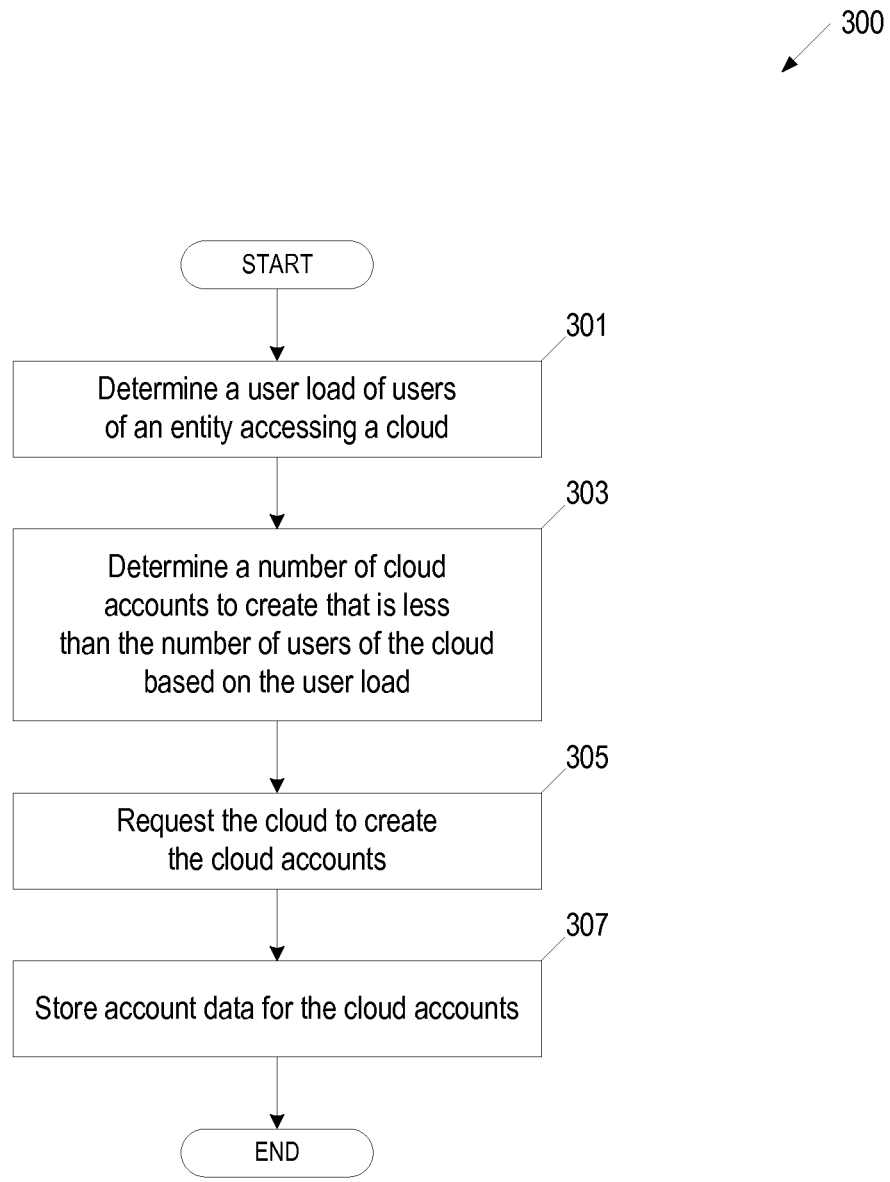
FIG. 3 is a flow diagram of an embodiment of a method for creating dynamically shared cloud accounts.

FIG. 3 is a flow diagram of an embodiment of a method 300 for creating dynamically shared cloud accounts. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a dynamic account provisioner 110 of FIG. 1.

At block 301, processing logic determines a user load representing the number of entity users that use the cloud. The user load can be represented as a percentage. Processing logic can receive user input indicating the user load. For example, processing logic receives user input indicating a user load of 10% that represents a percentage of Enterprise users that may use an expense reporting cloud service. An Enterprise may have 200 employees. The number of employees that travel and may incur travel expenses may be 50 employees. Multiple administrative assistants may handle the expense reporting for more than one employee. The user load of 10% can be an estimate that represents the percentage of Enterprise users that use the expense reporting cloud service.

At block 303, processing logic determines a number of shared cloud accounts to create at a cloud for an entity (e.g., Enterprise) based on the user load. The number of shared cloud accounts to create at the cloud is less than the number of entity users. For example, if the Enterprise has 200 users and the user load is 10%, processing logic may determine the number of shared cloud accounts that should be created in order to handle the user load of 10%. Processing logic may determine the number of shared cloud accounts that should be created is at least 20 and less than 200. At block 305, processing logic requests the cloud to create the shared cloud accounts based on the number and stores account data for the shared cloud accounts at block 307. The account data can include an account identifier for each shared cloud account.

Figure 4:
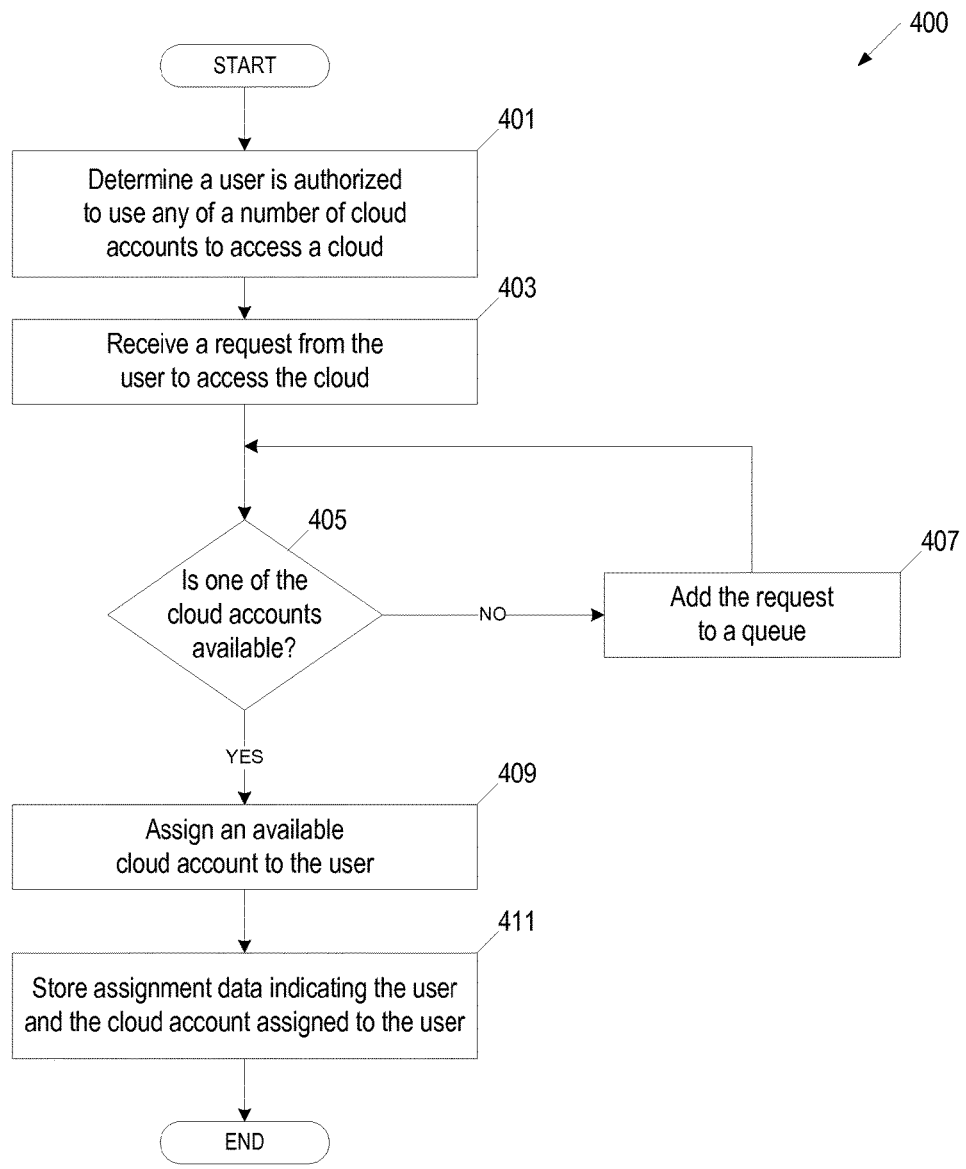
FIG. 4 is a flow diagram of an embodiment of a method for providing dynamically shared cloud accounts.

FIG. 4 is a flow diagram of an embodiment of a method 400 for providing dynamically shared cloud accounts. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by a dynamic account provisioner 110 of FIG. 1. Method 400 can be executed each time a user requests access to a cloud, according to some embodiments.

At block 401, processing logic determines that a user is authorized to use any of the shared cloud accounts for the clouds. For example, processing logic can determine that if a user can successfully login to the entity (e.g., Enterprise) network via user credentials, the user is authorized to use any of the shared cloud accounts to access a cloud. At block 403, processing logic receives a user request to access a cloud. For example, a user logs into the Enterprise network and selects a user interface (UI) element (e.g., button, icon, link, etc.) to request access to a particular cloud.

At block 405, processing logic determines whether any of the shared cloud accounts for the requested cloud are available to be assigned to the user. Processing logic can be coupled to a data store that stores assignment data indicating the available shared cloud accounts for each cloud that can be assigned to a user. If none of the shared cloud accounts for the requested cloud are available (block 405), processing logic adds the request to a queue at block 407. Processing logic returns to block 405 to determine whether any of the shared cloud accounts for the requested cloud are available to be assigned to the user.

In one embodiment, processing logic monitors the time of each session for the assigned shared cloud accounts and ends the session for the shared cloud account that has the most time elapsed to make it available for the next request. In another embodiment, if there is a request in the queue, processing logic ends the session of a shared cloud account that satisfies a time threshold. The time threshold can be a configurable value. The time threshold can be user-defined. For example the time threshold may be 30 minutes.

For example, there are 10 shared cloud accounts for Cloud-A. Processing logic has provisioned the 10 shared cloud accounts to 10 Enterprise users. Processing logic may receive a request from an 11$^{th}$ Enterprise user requesting access to Cloud-A. Processing logic can add the request for the 11$^{th}$ Enterprise user to a queue. Processing logic can identify which of the 10 shared cloud accounts has the longest session and can end the identified session to make it available for the request in the queue.

If a shared cloud account is available (block 405) processing logic assigns the available shared cloud account to the user at block 409. Processing logic can use an allocation algorithm to assign the shared cloud account to the user. An example of an allocation algorithm is a round-robin algorithm. At block 411, processing logic creates and store assignment data indicating the user and the shared cloud account that is assigned to the user. The assignment data can include a user identifier, a shared cloud account identifier, an access start time indicator, an access end time indicator.

Figure 5:
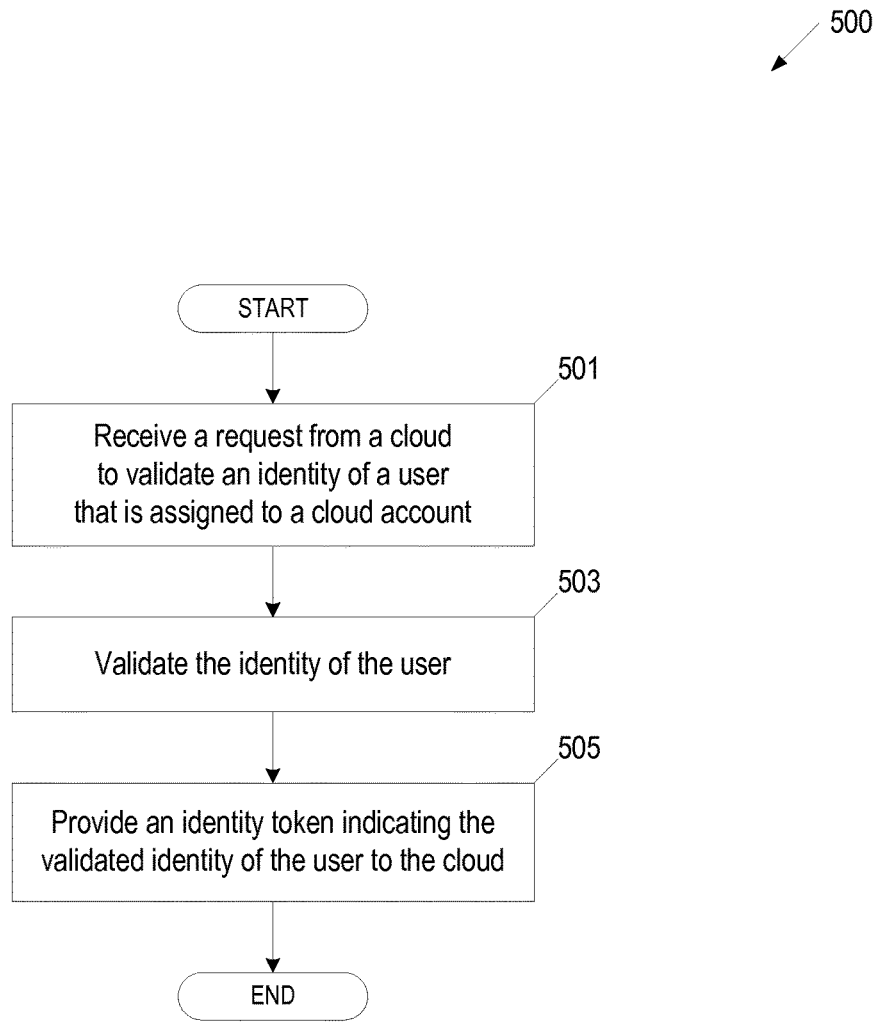
FIG. 5 is a flow diagram of an embodiment of a method for providing a cloud with the identity information of a user that is assigned a dynamically shared cloud account.

FIG. 5 is a flow diagram of an embodiment of a method 500 for providing a cloud the identity of a user that is assigned a dynamically shared cloud account. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by a dynamic account provisioner 110 of FIG. 1.

At block 501, processing logic receives a request from a cloud to validate the identity of a user that is assigned to a shared cloud account. The request can include a shared cloud account identifier. The request can include a user identifier. The request can be received via a federated identity protocol. A federated identity protocol can provide a framework for exchanging security information. Examples of a federated identity protocol can include, and are not limited to, Security Assertion Markup Language (SAML) and OpenID. At block 503, processing logic validates the identity of the user based on the data in the request. Processing logic can use a federated identity protocol to validate the user. For example, processing logic can provide a user a GUI requesting for user input of user credentials (e.g., username and password). Processing logic can receive the credentials and verify whether the credentials are valid. If the credentials are valid, processing logic provides an identity token indicating the validated identity of the user to the cloud at block 505. The identity token can be a Security Assertion Markup Language assertion or an OpenID identifier. The cloud can use the identity token to directly communicate with the user via the user device. If the credentials are not valid, processing logic can provide the cloud a notification indicating the user is not validated.

Figure 6:
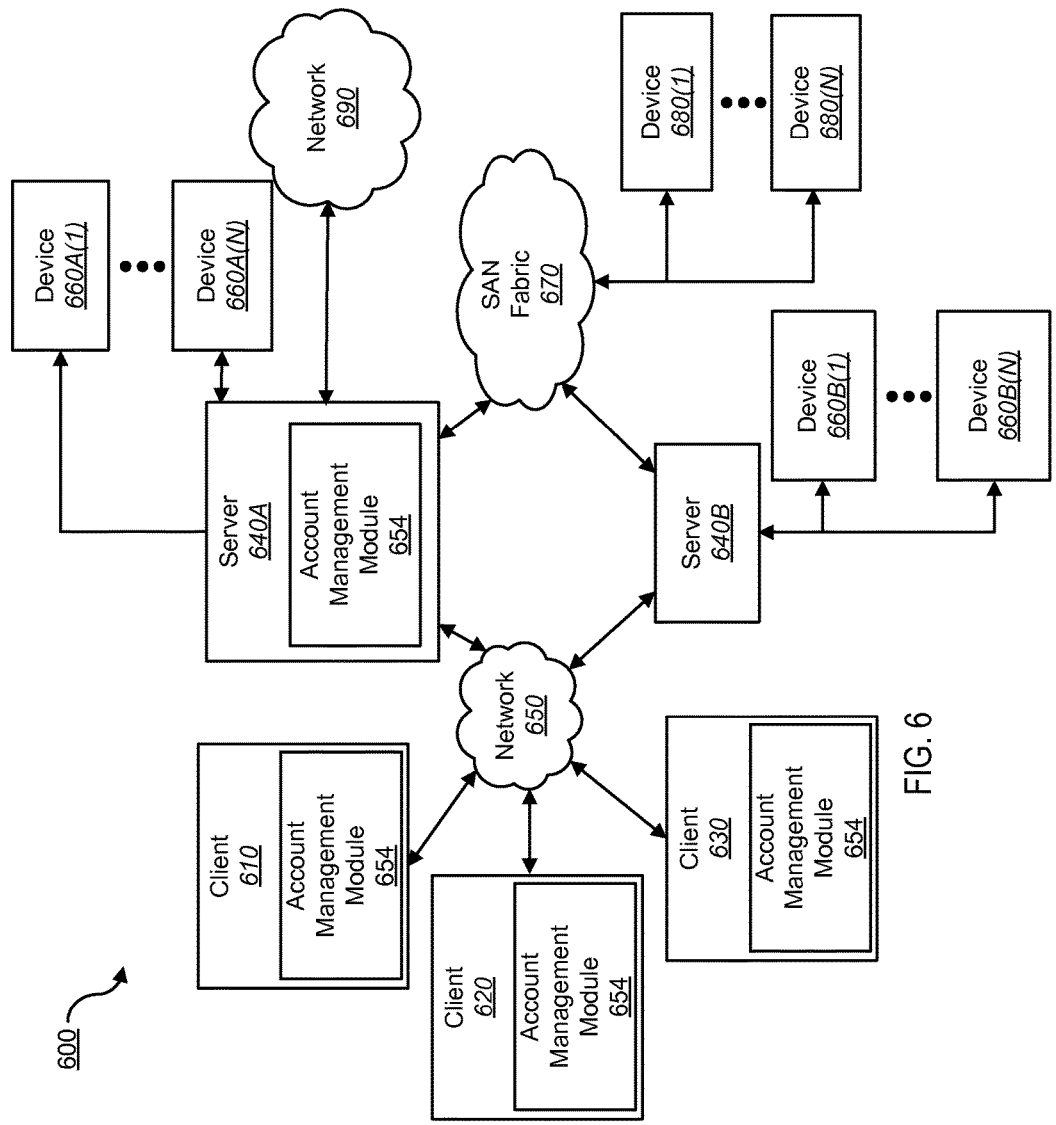
FIG. 6 shows a block diagram depicting a network architecture for providing role-based access control using dynamically shared cloud accounts in accordance with an embodiment of the present disclosure.

FIG. 6 shows a block diagram depicting a network architecture 100 for providing role-based access control using dynamically shared cloud accounts in accordance with an embodiment of the present disclosure. FIG. 6 is a simplified view of network architecture 600, which may include additional elements that are not depicted. Network architecture 600 may contain client systems 610, 620 and 630, as well as servers 640A and 640B (one or more of which may be implemented using computer system 1100 shown in FIG. 11). Client systems 610, 620 and 630 may be communicatively coupled to a network 650. Server 640A may be communicatively coupled to storage devices 660A(1)-(N), and server 640B may be communicatively coupled to storage devices 660B(1)-(N). Servers 640A and 640B may contain a management module (e.g., account management module 654 of server 640A). Servers 640A and 640B may be communicatively coupled to a SAN (Storage Area Network) fabric 670. SAN fabric 670 may support access to storage devices 680(1)-(N) by servers 640A and 640B, and by client systems 610, 620 and 630 via network 650.

Figure 11:
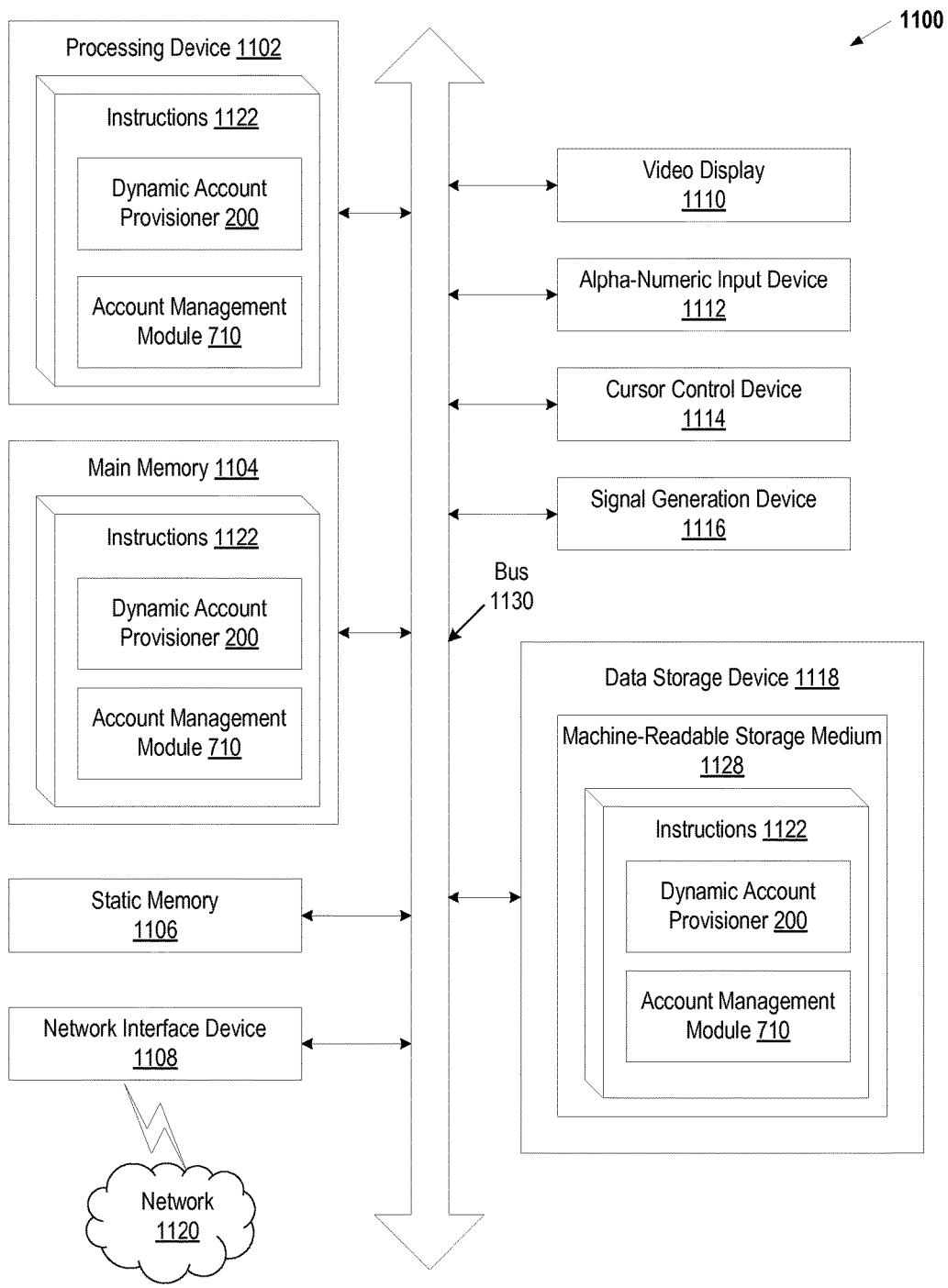
FIG. 11 is a block diagram of an exemplary computer system that may perform one or more of the operations described herein.

With reference to computer system 1100 of FIG. 11, cursor control device 1114, network interface device 1108, or some other method may be used to provide connectivity from one or more of client systems 610, 620 and 630 to network 650. Client systems 610, 620 and 630 may be able to access information on server 640A or 640B or one of storage devices 660A(1)-(N), 660B(1)-(N), and/or 680(1)-(N) using, for example, a web browser or other client software (not shown).

Networks 650 and 690 may be local area networks (LANs), wide area networks (WANs), the Internet, cellular networks, satellite networks, or other networks that permit communication between clients 610, 620, 630, servers 640, and other devices communicatively coupled to networks 650 and 690. Networks 650 and 690 may further include one, or any number, of the exemplary types of networks mentioned above operating as a stand-alone network or in cooperation with each other. Networks 650 and 690 may utilize one or more protocols of one or more clients or servers to which they are communicatively coupled. Networks 650 and 690 may translate to or from other protocols to one or more protocols of network devices. Although networks 650 and 690 are each depicted as one network, it should be appreciated that according to one or more embodiments, networks 650 and 690 may each comprise a plurality of interconnected networks.

Storage devices 660A(1)-(N), 660B(1)-(N), and/or 680 (1)-(N) may be network accessible storage and may be local, remote, or a combination thereof to server 640A or 640B. Storage devices 660A(1)-(N), 660B(1)-(N), and/or 680(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 660A(1)-(N), 660B(1)-(N), and/or 680(1)-(N) may be used for backup or archival purposes.

According to some embodiments, clients 610, 620, and 630 may be smartphones, PDAs, desktop computers, a laptop computers, servers, other computers, or other devices coupled via a wireless or wired connection to network 650. Clients 610, 620, and 630 may receive data from user input, a database, a file, a web service, and/or an application programming interface.

Servers 640A and 640B may be application servers, archival platforms, backup servers, network storage devices, media servers, email servers, document management platforms, enterprise search servers, or other devices communicatively coupled to network 650. Servers 640A and 640B may utilize one of storage devices 660A(1)-(N), 660B(1)-(N), and/or 680(1)-(N) for the storage of application data, backup data, or other data. Servers 640A and 640B may be hosts, such as an application server, which may process data traveling between clients 610, 620, and 630 and a backup platform, a backup process, and/or storage. According to some embodiments, servers 640A and 640B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 610, 620, and/or 630 may contain one or more portions of software for providing role-based access control using dynamically shared cloud accounts such as, for example, account management module 654. As illustrated, one or more portions of account management module 654 may reside at a network centric location. For example, server 640A may be a server, a firewall, a gateway, or other network element that may perform one or more actions to provide role-based access control using dynamically shared cloud accounts. According to some embodiments, network 690 may be an external network (e.g., the Internet) and server 640A may be a gateway or firewall between one or more internal components and clients and the external network.

Account management module 654 may provide, among other things, role-based access control (RBAC) for Software-as-a-Service (SaaS) or a cloud computing model for an enterprise. On the SaaS provider side, at least one account may be setup. Each of the at least one accounts may be setup with specific permissions for a designated role in the organization. Furthermore, each account may be pre-configured with variable access rights for one or more users.

When a user logs in to access one or more features of one or more SaaS, account management module 654 may be responsible for single sign on, user identification, authentication and authorization for all the users. For example, account management module 654 may not only grant access to the user (e.g., via single sign-on), but also provision a particular account to one or more SaaS providers associated with the account management module 654. Based on the role and responsibility of the user in an organization or company, the user may be dynamically provisioned to any one of the preconfigured user accounts. Thus, the access of the user on the SaaS application may be accessible and/or restricted based on role and his permissions.

Accordingly, account management module 654 may integrate role-based access control throughout an organization without dependency on the SaaS provider and/or specific implementation requirements of the SaaS. By dynamically mapping each of a plurality of users to one or more accounts for one or more of the various roles created for one or more SaaS, role-based access control using dynamically shared cloud accounts may be provided to a SaaS applications on the cloud through federated identity management.

Figure 7:
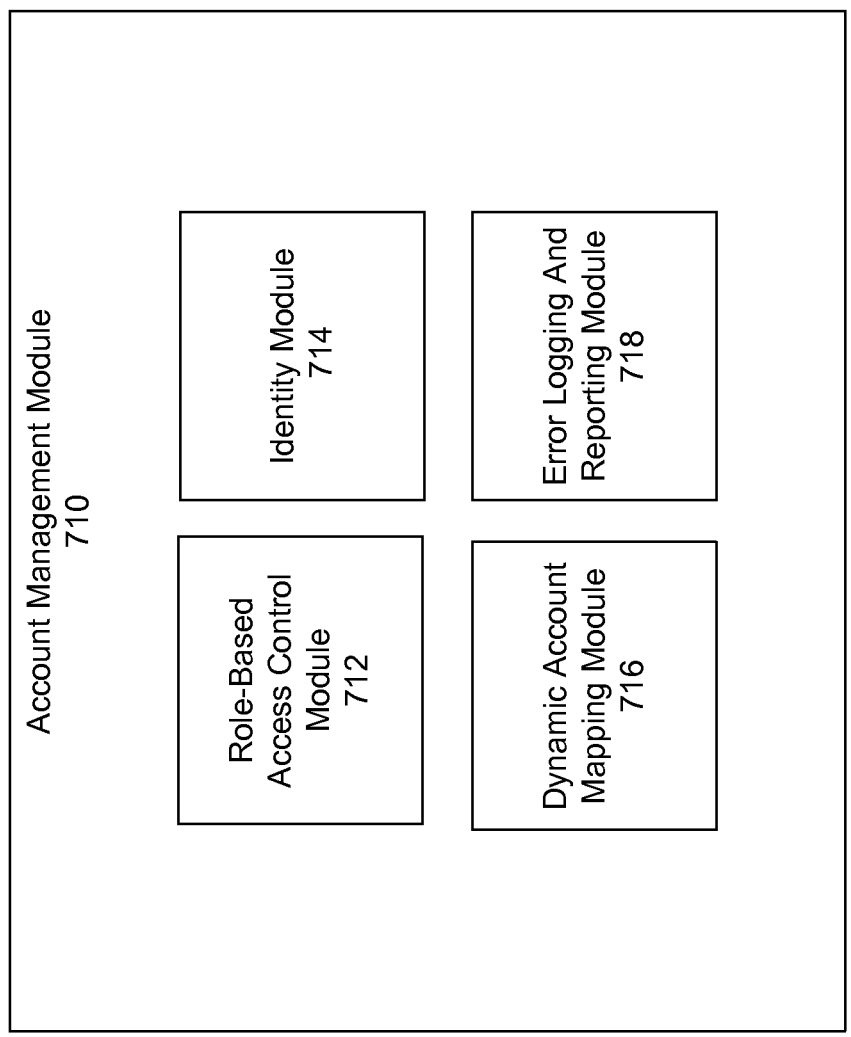
FIG. 7 shows a module for providing role-based access control using dynamically shared cloud accounts in accordance with an embodiment of the present disclosure.

FIG. 7 shows a module 710 for providing role-based access control using dynamically shared cloud accounts in accordance with an embodiment of the present disclosure. Referring to FIG. 7, there is shown an account management module 710 in accordance with an embodiment of the present disclosure. As illustrated, the account management module 710 may contain one or more components including role-based access control module 712, identity module 714, dynamic account mapping module 716, and error logging and reporting module 718.

The description below describes network elements, computers, and/or components of a system and method for providing role-based access control using dynamically shared cloud accounts that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Role-based access control module 712 may request creation of one or more accounts with one or more SaaS. Role-based access control module 712 may create one or more profiles. Each of the one or more profiles may provide permissions for either a specific object or a set of objects. For each role that represents a specific job function, role-based access control module 712 may assign a specific set of permissions profile applicable to that role. For each role, role-based access control module 712 may create at least one account on the SaaS provider. It should be appreciated that many accounts may be created for a particular role to enable multiple users to login at the same time. As used herein, these accounts may be referred to as "pseudo accounts." In effect, one or more pseudo accounts may serve as one or more slots associated with a particular role for an account at the SaaS provider.

In some embodiments, a user may have hold one role for a specific application. Here, when the user switches application, the user may assume a different role and may perform an action specific to that role. However, this may not always be the case.

In some embodiments, roles for each pseudo account may differ for each user across various applications. For example, an employee may have employee-level access in one SaaS application and may be a system administrator for another SaaS application.

One benefit with role-based access control using dynamically shared cloud accounts across multiple applications may be that if any updates to the various roles needed to occur, access privileges may be adjusted through adjustments in the pseudo account level. Any user associated with that particular role would receive a corresponding change in accessibility and privilege to their user account. This may provide greater flexibility, efficiency, and reliability.

Identity module 714 may provide a user interface to a plurality of users in an organization. For example, rather than directly logging in to an individual account at the SaaS application, a user may log into via this user interface. Identity module 714 may provide, among other things, various features, including, but not limited to single sign-on, user identification, authentication and authorization, and/or role-based verification.

One benefit with using identity module 714 may be that users seeking access to one or more SaaS applications may be allowed, e.g., via a single sign on procedure, to access one or more accounts on a plurality of SaaS applications without logging in multiple times. Again, this may provide greater flexibility and efficiency.

Dynamic account mapping module 716 may map each user who logs in via identity module 714 to one or more pseudo accounts. Mapping to these pseudo accounts may be dynamic. As described above, since there may be a limited number of pseudo account created for each role at each SaaS, dynamic account mapping module 716 may be able to assign one or more users to access to each SaaS based on an availability of each pseudo account or take other priority measures.

Error logging and reporting module 718 may produce logs, reports, or other information associated with providing role-based access control using dynamically shared cloud accounts.

Figure 8:
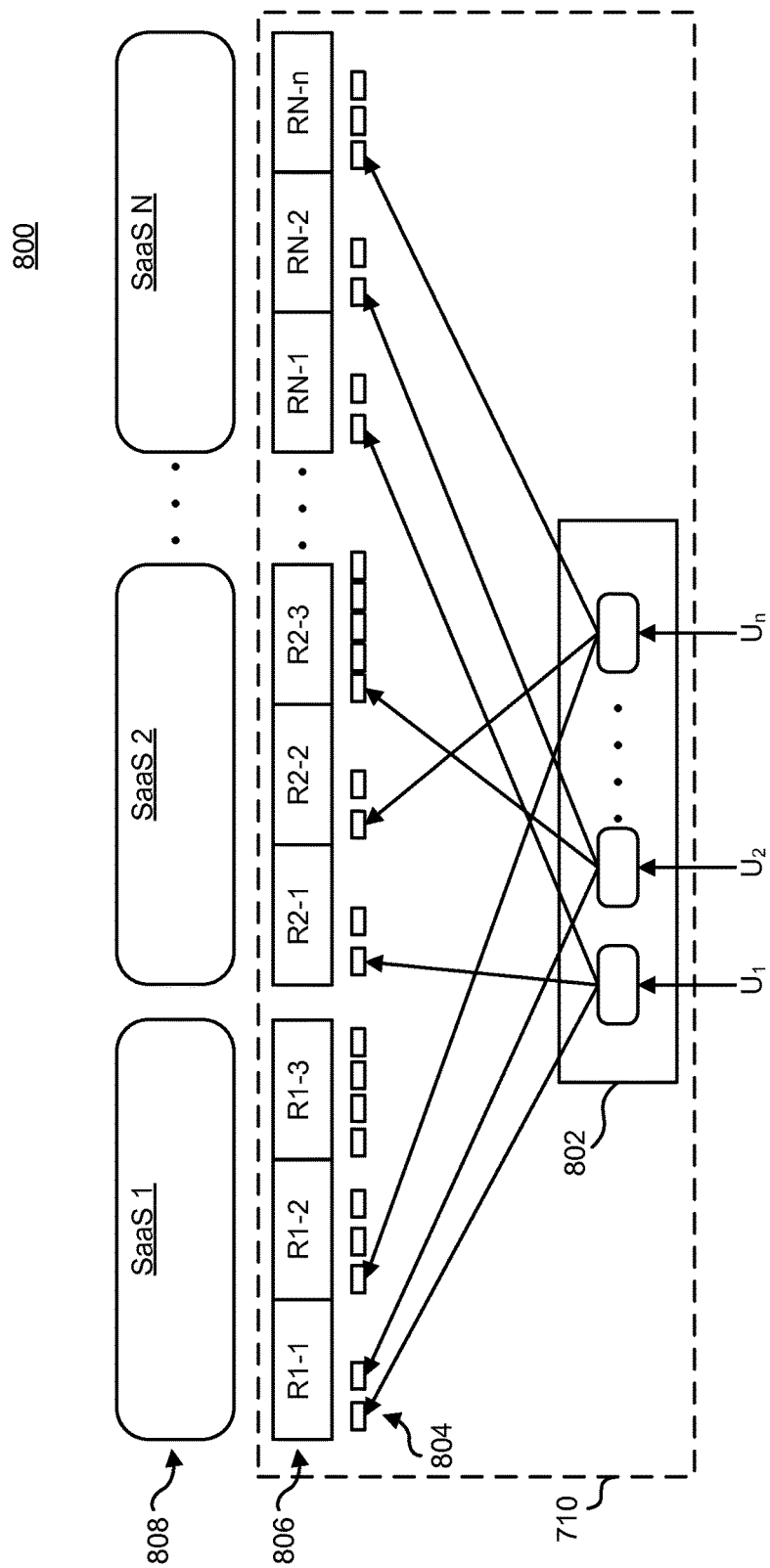
FIG. 8 depicts a mapping schematic for providing role-based access control using dynamically shared cloud accounts in accordance with an embodiment of the present disclosure.

FIG. 8 depicts a mapping schematic 800 for providing role-based access control using dynamically shared cloud accounts in accordance with an embodiment of the present disclosure. Referring to FIG. 8, a plurality of users, $U_1$, $U_2$, ..., $U_n$, may seek access to one or more cloud services, e.g., SaaS 1, SaaS 2, ..., SaaS n. To gain access, each user $U_1$, $U_2$, or $U_n$ may login to corresponding user accounts 802 at the account management module 710. The user accounts 802 may be mapped to one or more pseudo accounts 804 based on predetermined roles 806 for the SaaS 808.

For example, SaaS 1 may be a sales service, such as SalesForce.com, SaaS 2 may be an accounting service, such as Concur Expense Reporting, and SaaS N may be a GoogleDocs document service, where N may be an integer. There may be accounts created at SaaS 1 with the following corresponding roles: R1-1, R1-2, and R1-3. R1-1 may be directed to a sales manager role, R1-2 may be directed to a sales representative role, and R1-3 may be directed to public view role. There may be accounts created at SaaS 2 with the following corresponding roles: R2-1, R2-2, and R2-3. R2-1 may be directed to a finance role, R2-2 may be directed to a manager role, and R2-3 may be directed to an employee role. There may be accounts created at SaaS 3 with the following corresponding roles: RN-1, RN-2, and R1-$n$. RN-1 may be directed to a full editor role, RN-2 may be directed to a partial editor role, and RN-n may be directed to read-only role, where n may be an integer.

When a user $U_i$ logs in via the account management module 710, user $U_i$ may have sales manager privileges at SaaS 1, finance privileges at SaaS 2, and full editor access at SaaS N. In this example, user $U_i$ may be an executive at a particular corporation who has full or almost full access to all the SaaS applications.

User $U_2$ may also log in via the account management module 710. While user $U_2$ may have sales manager access to SaaS 1, user $U_2$ may have only employee access in SaaS 2 and partial editor access in SaaS N. As a result, depending on an employee's role in an organization, his or her user-level access to one or more SaaS applications may be preconfigured accordingly in the accounts management module 710.

User $U_n$ may also log in at the same time that user $U_1$ and user $U_2$ are logged in. In one scenario, $U_n$ may also have sales manager privileges to SaaS 1. However, since user $U_1$ and user $U_2$ are already logged in to the only two pseudo accounts created for that role, R1-1, user $U_n$ may not have access to SaaS 1 as a sales manager at that time. In some embodiments, user $U_n$ may be denied access. In other embodiments, user $U_n$ may be asked to wait. In yet other embodiments, user $U_n$ may be granted access to another role that would provide equal or lesser access privileges than R1-1. For example, user $U_n$ may be offered access to R1-2 instead. Here, user $U_n$ may accept since user $U_n$ may only need to access information on SaaS 1 that both sales managers and sales representatives can access. Therefore, account management module 710 may provide dynamic mapping to the one or more shared cloud accounts for each of the plurality of SaaS applications.

Figure 9:
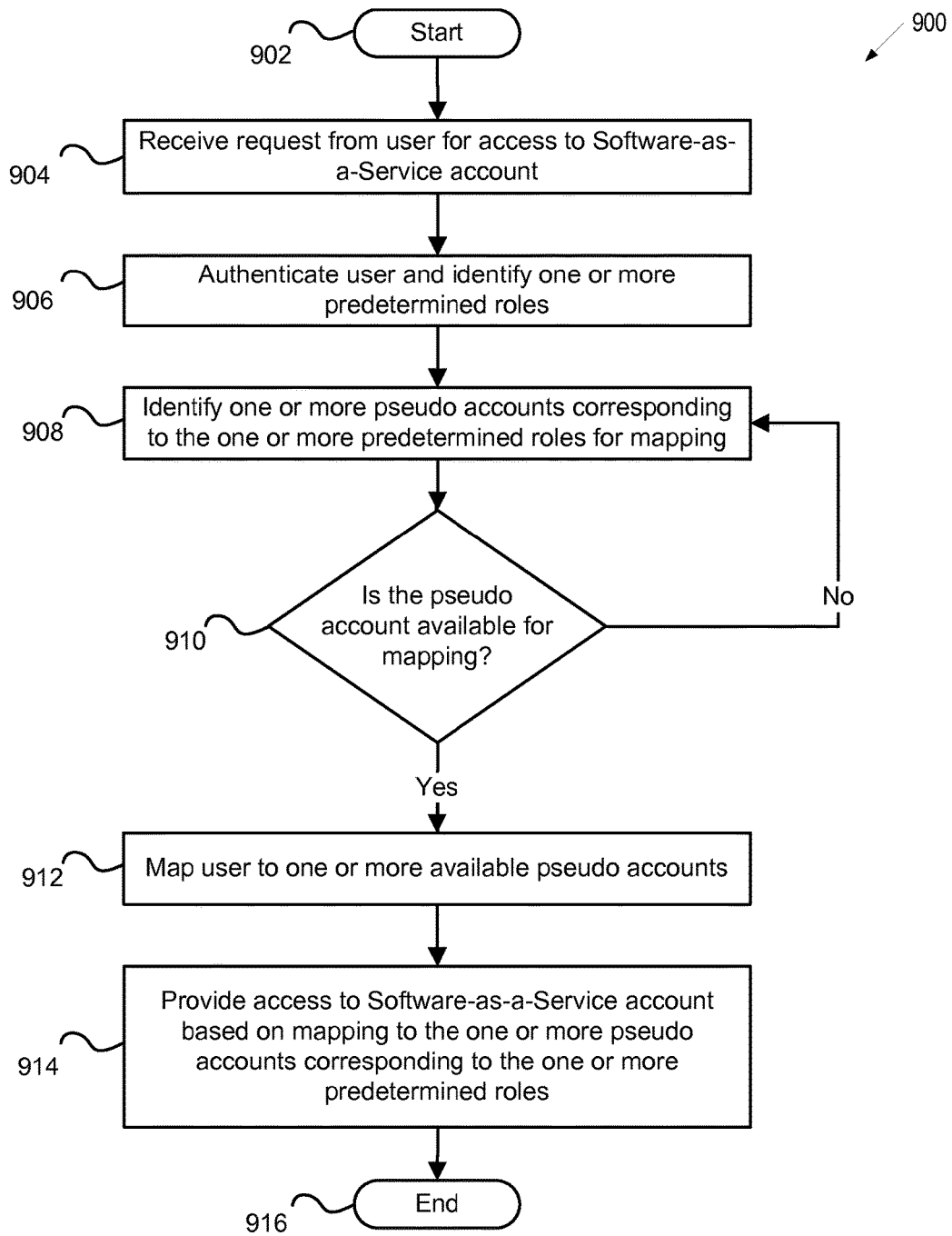
FIG. 9 depicts a flowchart of a method for providing role-based access control using dynamically shared cloud accounts in accordance with an embodiment of the present disclosure.

FIG. 9 depicts a flowchart 900 of a method for providing role-based access control using dynamically shared cloud accounts in accordance with an embodiment of the present disclosure. The exemplary method 900 is provided by way of example, as there are a variety of ways to carry out methods disclosed herein. The method 900 shown in FIG. 9 may be executed or otherwise performed by one or a combination of various systems. The method 900 is described below as carried out by at least system 600 in FIG. 6, architecture 1100 in FIG. 11, module 710 in FIG. 7, and schematic 800 of FIG. 8, by way of example, and various elements of systems 600, 1100, 710, and 800 are referenced in explaining the exemplary method of FIG. 9. Each block shown in FIG. 9 represents one or more processes, methods, or subroutines carried in the exemplary method 900. A non-transitory computer-readable medium comprising code, which when performed by a computer, may perform the acts of the method 900 may also be provided. Referring to FIG. 9, the exemplary method 900 may begin at block 902.

At block 902, the method 900 may begin. At block 904, a request from a user may be received at the account management module 710. The request may be for access to one or more Software-as-a-Service (SaaS) accounts. The request may include a user identifier, password, and/or other identifier.

At block 906, the account management module 710 may authenticate the user using a variety of authentication techniques. For example, the user may be authenticated based on one or more profiles associated with data associated with the user, e.g., user identifier, password, and/or other identifier. In addition authentication, one or more predetermined roles associated with one or more accounts of the SaaS may be identified.

At block 908, the account management module 710 may identify one or more pseudo accounts corresponding to the one or more predetermined roles for mapping the user to the one or more pseudo accounts. In some embodiments, availability of the one or more pseudo accounts may be determined 910. If, for example, the one or more pseudo accounts are not available for mapping, e.g., because the one or more pseudo accounts are being accessed by other users in the organization at the time of the request/mapping, mapping the user to the one or more pseudo accounts may halt and continue at a later time. In some embodiments, other available pseudo accounts corresponding to other equal or lesser roles may be made available to the user. In other embodiments, the user may simply be denied access to the account and would try mapping later.

At block 912, the account management module 710 may map the user to the one or more pseudo accounts in the event the one or more pseudo accounts are available for mapping. As discussed above, in some cases, the account management module 710 may map the user to another pseudo account with equal or lesser privileges if the pseudo account corresponding to the predetermined roles is unavailable.

At block 914, the account management module 710 may provide access to the one or more Software-as-a-Service accounts based on the mapping of the user to the one or more pseudo accounts corresponding to the one or more predetermined roles of the user. At block 916, the method 900 may end.

Figure 10:
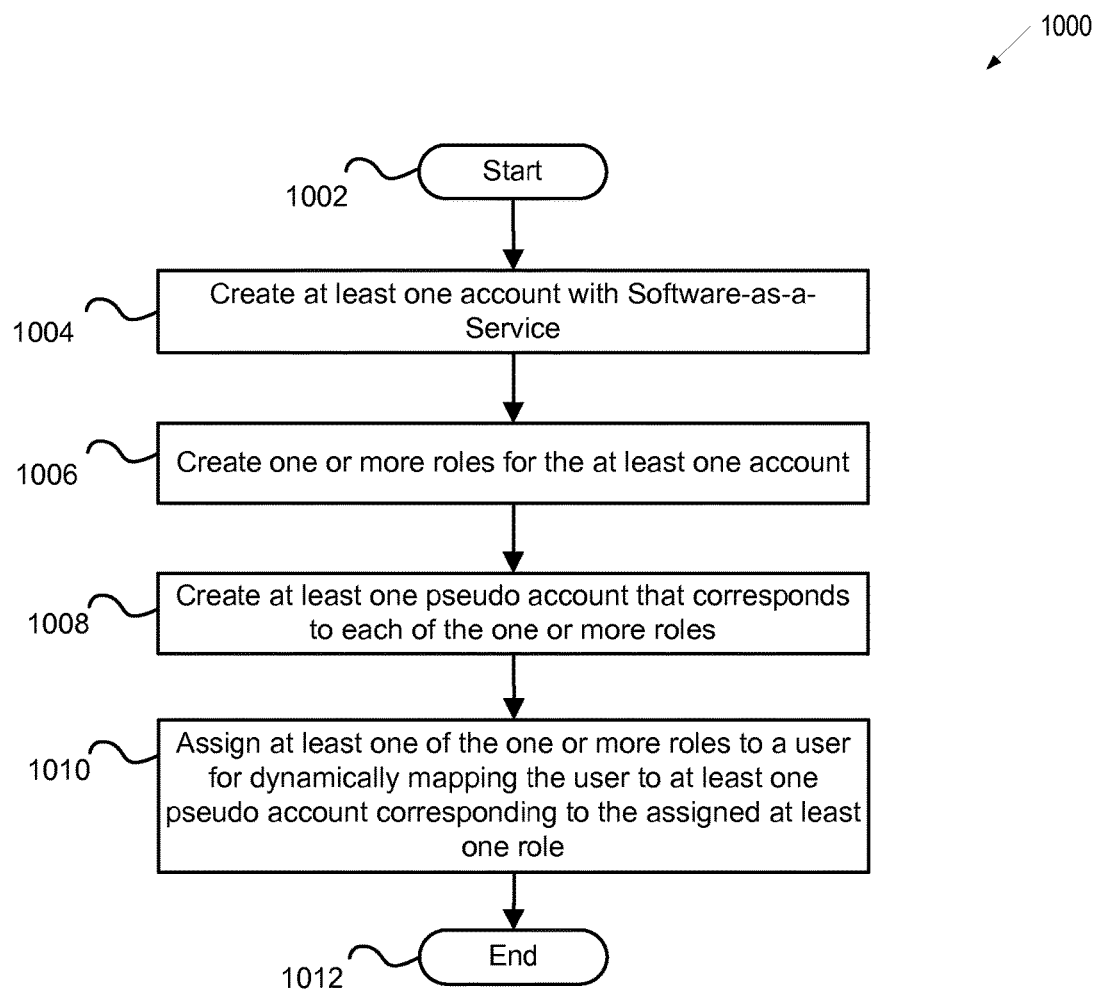
FIG. 10 depicts a flowchart of a method for providing role-based access control using dynamically shared cloud accounts in accordance with an embodiment of the present disclosure.

FIG. 10 depicts a flowchart 1000 of a method for providing role-based access control using dynamically shared cloud accounts in accordance with an embodiment of the present disclosure. The exemplary method 1000 is provided by way of example, as there are a variety of ways to carry out methods disclosed herein. The method 1000 shown in FIG. 10 may be executed or otherwise performed by one or a combination of various systems. The method 1000 is described below as carried out by at least system 600 in FIG. 6, architecture 1100 in FIG. 11, module 710 in FIG. 7, and schematic 800 of FIG. 8, by way of example, and various elements of systems 100, 200, 710, and 800 are referenced in explaining the exemplary method of FIG. 10. Each block shown in FIG. 10 represents one or more processes, methods, or subroutines carried in the exemplary method 1000. A non-transitory computer-readable medium comprising code, which when performed by a computer, may perform the acts of the method 1000 may also be provided. Referring to FIG. 10, the exemplary method 1000 may begin at block 1002. At block 1002, the method 1000 may begin. At block 1004, at least one account may be created with a Software-as-a-Service (SaaS). In some embodiments, this may be achieved using the account management module 710. The account may be a shared cloud account with preconfigured rules and privileges.

At block 1006, one or more roles for the at least one account may be created. These roles may also have preconfigured rules and privileges based on needs of an organization's policies and roles of its users. In some embodiments, this may be achieved using the account management module 710.

At block 1008, at least one pseudo account corresponding to each of the one or more roles may be created. In some embodiments, this may be achieved using the account management module 710. At block 1010, at least one of the one or more roles may be assigned to a user for dynamically mapping the user to at least one pseudo account for access to the one or more SaaS account based on the one or more roles. In some embodiments, this may be achieved using the account management module 710. At block 1012, the method 1000 may end.

FIG. 11 illustrates a diagram of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM), double data rate (DDR SDRAM), or DRAM (RDRAM), etc.), a static memory 1106 (e.g., flash memory, static random access memory (SRAM), etc.), and a data storage device 1118, which communicate with each other via a bus 1130.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1102 may also be one or more special-purpose processing devices such as an application specific integrated circuit (ASIC), a field programmable gate array (FPGA), a digital signal processor (DSP), network processor, or the like. The processor 1102 is configured to execute instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable storage medium 1128 on which is stored one or more sets of instructions 1122 (e.g., software) embodying any one or more of the methodologies or functions described herein. The instructions 1122 may also reside, completely or at least partially, within the main memory 1104 and/or within the processor 1102 during execution thereof by the computer system 1100, the main memory 1104 and the processor 1102 also constituting computer-readable storage media. The instructions 1122 may further be transmitted or received over a network 1120 via the network interface device 1108.

In one embodiment, the instructions 1122 include instructions for a dynamic account provisioner (e.g., dynamic account provisioner 200 of FIG. 2) and/or an account management module (e.g., account management module 710 of FIG. 7) and/or a software library containing methods that call the dynamic account provisioner and/or account management module. While the computer-readable storage medium 1128 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "receiving", "adding", "assigning," "verifying," "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, at a server computer system within a network of an organization, a request from a user to access a cloud account, wherein the request comprises a user identifier of the user;
   authenticating, at the server computer system, the user for access to the cloud account based on the user identifier;
   identifying one or more predetermined roles associated with the cloud account for the user;
   identifying one or more pseudo accounts associated with the cloud account, the pseudo accounts to define one or more slots associated with the one or more predetermined roles for the cloud account, wherein access privileges to the cloud account correspond to the one or more pseudo accounts;
   mapping the user to the one or more pseudo accounts, wherein the mapping comprises matching the one or more predetermined roles for the user with the one or more pseudo accounts; and providing the user access to the cloud account based on the mapping and with the access privileges corresponding to the one or more pseudo accounts.

2. The method of claim 1, wherein the cloud account is a shared Software-as-a-Service (SaaS) account.

3. The method of claim 1, wherein the user identifier further comprises a user password.

4. The method of claim 1, wherein authenticating the user further comprises providing a single sign-on access to at least the cloud account, wherein the single sign-on access uses the user identifier.

5. The method of claim 1, wherein mapping the user to the one or more pseudo accounts comprises a dynamic mapping, wherein the dynamic mapping comprises performing an action in the event the one or more pseudo accounts are unavailable.

6. The method of claim 5, wherein the action comprises at least one of notifying the user of the unavailability of the one or more pseudo accounts; halting the mapping action; or determining availability of one or more other pseudo accounts of equal or lesser access privileges and mapping the user to the one or more other pseudo accounts.

7. The method of claim 1, further comprising:
receiving, at the server computer system, an additional request for access to another cloud account, wherein the request comprises the user identifier;
authenticating, at the server computer system, the user for access to the other cloud account based on a single sign-on access to the other cloud account;
identifying one or more predetermined roles associated with the other cloud account for the user;
identifying one or more pseudo accounts associated with the other cloud account, wherein access privileges to the other cloud account correspond to the one or more pseudo accounts;
mapping the user to the one or more pseudo accounts, wherein the mapping comprises matching the one or more predetermined roles associated with the other cloud account for the user with one or more pseudo accounts associated with the other cloud account; and
providing the user access to the cloud account based on the mapping and with the access privileges to the other cloud account corresponding to the one or more pseudo accounts associated with the other cloud account.

8. A system comprising:
a memory; and
a processor coupled to the memory to:
receive a request from a user to access a cloud account, wherein the request comprises a user identifier of the user;
authenticate the user for access to the cloud account based on the identifier;
identify one or more predetermined roles associated with the cloud account for the user;
identify one or more pseudo accounts associated with the cloud account, the pseudo accounts to define one or more slots associated with the one or more predetermined roles for the cloud account, wherein access privileges to the cloud account correspond to the one or more pseudo accounts;
map the user to the one or more pseudo accounts, wherein the mapping comprises matching the one or more predetermined roles for the user with the one or more pseudo accounts; and
provide the user access to the cloud account based on the mapping and with the access privileges corresponding to the one or more pseudo accounts.

9. The system of claim 8, wherein the cloud account is a shared Software-as-a-Service (SaaS) account.

10. The system of claim 8, wherein the user identifier further comprises a user password.

11. The system of claim 8, wherein to authenticate the user the processor further to provide a single sign-on access to at least the cloud account, wherein the single sign-on access uses the user identifier.

12. The system of claim 8, wherein to map the user to the one or more pseudo accounts further comprises a dynamic mapping, wherein the dynamic mapping the processor further to perform an action in the event the one or more pseudo accounts are unavailable.

13. The system of claim 12, wherein to perform the action, the processor is to perform at least one of notify the user of the unavailability of the one or more pseudo accounts; halt the mapping action; or determine availability of one or more other pseudo accounts of equal or lesser access privileges and map the user to the one or more other pseudo accounts.

14. The system of claim 8, the processor further to:
receive, at the server computer system, an additional request for access to another cloud account, wherein the request comprises the user identifier;
authenticate, at the server computer system, the user for access to the other cloud account based on a single sign-on access to the other cloud account;
identify one or more predetermined roles associated with the other cloud account for the user;
identify one or more pseudo accounts associated with the other cloud account, wherein access privileges to the other cloud account correspond to the one or more pseudo accounts;
map the user to the one or more pseudo accounts, wherein the mapping comprises matching the one or more predetermined roles associated with the other cloud account for the user with one or more pseudo accounts associated with the other cloud account; and
provide the user access to the cloud account based on the mapping and with the access privileges to the other cloud account corresponding to the one or more pseudo accounts associated with the other cloud account.

15. A non-transitory computer readable storage medium including instructions that, when executed by a processor, cause the processor to perform a method comprising:
receiving, at a server computer system within a network of an organization, a request from a user to access a cloud account, wherein the request comprises a user identifier of the user;
authenticating, at the server computer system, the user for access to the cloud account based on the identifier;
identifying one or more predetermined roles associated with the cloud account for the user;
identifying one or more pseudo accounts associated with the cloud account, the pseudo accounts to define one or more slots associated with the one or more predetermined roles for the cloud account, wherein access privileges to the cloud account correspond to the one or more pseudo accounts;
mapping the user to the one or more pseudo accounts, wherein the mapping comprises matching the one or more predetermined roles for the user with the one or more pseudo accounts; and
providing the user access to the cloud account based on the mapping and with the access privileges corresponding to the one or more pseudo accounts.

16. The non-transitory computer readable storage medium of claim 15, wherein the cloud account is a shared Software-as-a-Service (SaaS) account.

17. The non-transitory computer readable storage medium of claim 15, wherein the user identifier further comprises a user password.

18. The non-transitory computer readable storage medium of claim 15, wherein authenticating the user further comprises providing a single sign-on access to at least the cloud account, wherein the single sign-on access uses the user identifier.

19. The non-transitory computer readable storage medium of claim 15, wherein mapping the user to the one or more pseudo accounts comprises a dynamic mapping, wherein the dynamic mapping comprises performing an action in the event the one or more pseudo accounts are unavailable.

20. The non-transitory computer readable storage medium of claim 19, wherein the action comprises at least one of notifying the user of the unavailability of the one or more pseudo accounts; halting the mapping action; or determining availability of one or more other pseudo accounts of equal or lesser access privileges and mapping the user to the one or more other pseudo accounts.

* * * * *